United States Patent
Hirai et al.

(10) Patent No.: US 7,573,592 B2
(45) Date of Patent: Aug. 11, 2009

(54) STATUS DATA TRANSMISSION OF IMAGE PROCESSING APPARATUS

(75) Inventors: Nobuyuki Hirai, Chiba (JP); Reiji Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 837 days.

(21) Appl. No.: 10/460,229

(22) Filed: Jun. 13, 2003

(65) Prior Publication Data

US 2003/0233443 A1      Dec. 18, 2003

(30) Foreign Application Priority Data

Jun. 18, 2002     (JP)     .............................. 2002-177640

(51) Int. Cl.
*G06F 3/12*      (2006.01)
*G06K 15/02*    (2006.01)
*H04N 1/21*      (2006.01)
*H04N 1/32*      (2006.01)
*H04N 1/327*    (2006.01)
*H04N 1/333*    (2006.01)
*G06F 3/00*      (2006.01)

(52) U.S. Cl. ..................... 358/1.15; 358/1.13; 358/406; 358/434; 358/435; 358/468; 358/437; 358/438; 358/439; 358/1.16

(58) Field of Classification Search ........................ None
See application file for complete search history.

(56) References Cited

U.S. PATENT DOCUMENTS

| | | | | |
|---|---|---|---|---|
| 4,930,087 A * | 5/1990 | Egawa et al. ................ 358/1.14 |
| 5,220,674 A * | 6/1993 | Morgan et al. .............. 709/223 |
| 5,706,412 A * | 1/1998 | Kojo .......................... 358/1.14 |
| 5,720,014 A | 2/1998 | Ikeda et al. .................. 395/114 |
| 5,848,318 A * | 12/1998 | Okimoto ........................ 399/8 |
| 5,905,582 A | 5/1999 | Hirai et al. .................. 358/468 |
| 5,937,151 A * | 8/1999 | Kadota ...................... 358/1.15 |
| 6,141,111 A * | 10/2000 | Kato .......................... 358/1.15 |
| 6,262,805 B1 * | 7/2001 | Ishikawa et al. ........... 358/1.15 |
| 6,266,162 B1 | 7/2001 | Okamura et al. ............ 358/468 |
| 6,434,643 B1 * | 8/2002 | Ejiri ............................. 710/58 |
| 6,734,985 B1 * | 5/2004 | Ochiai ........................ 358/1.15 |
| 6,811,334 B2 * | 11/2004 | Koike et al. .................. 400/61 |
| 6,864,991 B1 * | 3/2005 | Takahashi .................. 358/1.15 |
| 6,912,060 B1 * | 6/2005 | Luciano et al. ............ 358/1.15 |

(Continued)

FOREIGN PATENT DOCUMENTS

JP           7-288625           10/1995

(Continued)

*Primary Examiner*—Twyler L Haskins
*Assistant Examiner*—Myles D Robinson
(74) *Attorney, Agent, or Firm*—Fitzpatrick, Cella, Harper & Scinto

(57) ABSTRACT

Image processing apparatus comprises, a first USB interface which connects with an external processing apparatus, a second USB interface which connects with a data processing unit, and a control unit which controls data transfer between the first USB interface and second USB interface. The control unit notifies the data processing unit of management data, which is managed by the control unit, via the second USB interface. The data processing unit generates status data of the data processing unit, including the notified management data. In response to a request from the external processing apparatus, the generated status data is transmitted to the external processing apparatus via the first USB interface and second USB interface.

10 Claims, 11 Drawing Sheets

U.S. PATENT DOCUMENTS

| | | | |
|---|---|---|---|
| 7,529,920 B2 * | 5/2009 | Hirai | 713/1 |
| 2002/0089692 A1 * | 7/2002 | Ferlitsch | 358/1.15 |
| 2002/0186410 A1 * | 12/2002 | Tanaka | 358/1.15 |
| 2003/0002073 A1 * | 1/2003 | Berkema et al. | 358/1.15 |
| 2003/0123074 A1 * | 7/2003 | Imai et al. | 358/1.9 |
| 2003/0189719 A1 * | 10/2003 | Saito et al. | 358/1.14 |
| 2003/0197890 A1 * | 10/2003 | Satake et al. | 358/1.15 |
| 2005/0055475 A1 * | 3/2005 | MacKay et al. | 710/15 |
| 2005/0062997 A1 * | 3/2005 | Hasegawa et al. | 358/1.13 |
| 2005/0278521 A1 * | 12/2005 | Hirai | 713/1 |
| 2007/0011362 A1 * | 1/2007 | Umekage et al. | 710/15 |
| 2007/0046972 A1 * | 3/2007 | Hirai | 358/1.13 |
| 2007/0171877 A1 * | 7/2007 | Hasegawa et al. | 370/338 |

FOREIGN PATENT DOCUMENTS

| | | |
|---|---|---|
| JP | 11-032151 | 2/1999 |
| JP | 2001-202223 | 7/2001 |
| JP | 2002-123376 | 4/2002 |

* cited by examiner

FIG. 4

301 DEVICE

302 CONFIGURATION 1

ENDPOINT 0: APPARATUS CONTROL ~ 303

INTERFACE 0: PRINTER ~ 304

ENDPOINT 1: CONTROL/PRINT DATA RECEPTION ~ 305
ENDPOINT 2: PRINT STATUS TRANSMISSION ~ 306

INTERFACE 1: SCANNER ~ 307

ENDPOINT 3: READ DATA TRANSMISSION ~ 308
ENDPOINT 4: CONTROL DATA RECEPTION ~ 309
ENDPOINT 5: SCAN START TRANSMISSION ~ 310

INTERFACE 2: FAX ~ 311

ENDPOINT 6: CONTROL/TRANSMISSION DATA RECEPTION ~ 312
ENDPOINT 7: RECEPTION DATA/COMMUNICATION STATUS TRANSMISSION
ENDPOINT 8: RECEPTION END TRANSMISSION ~ 314
313

STATUS DATA TRANSMISSION OF IMAGE PROCESSING APPARATUS

FIELD OF THE INVENTION

The present invention relates to a technique of transmitting status data of a data processing apparatus, which is connected to an image processing apparatus, to an external processing apparatus.

BACKGROUND OF THE INVENTION

As a known facsimile apparatus connectable with a data processing terminal, such as a personal computer, there is a facsimile apparatus connected with the terminal through a two-way parallel port interface (compliant with IEEE 1284), e.g., Centronics or the like, or a Universal Serial Bus (USB) interface, as disclosed in Japanese Patent Application Laid-Open No. 7-288625.

In an image processing system constructed with the aforementioned facsimile apparatus and a data processing terminal, as a connection form between the facsimile apparatus and data processing terminal, a single logical interface is assigned to a single physical interface.

Furthermore, a main control unit and a printing unit included inside the facsimile apparatus are connected through one-way parallel communication and a two-way serial interface.

Meanwhile, simultaneous operation of functions, such as a printer, a scanner, a digital camera, a card reader/writer, a facsimile communication and the like, can easily be realized by adopting a USB to a physical interface between an external processing apparatus and facsimile apparatus and providing a plurality of logical channels (USB composite device) compliant with the USB standard.

Furthermore, by adopting a USB to a physical interface between the main control unit of the facsimile apparatus and a sub control unit of a data processing unit/processor provided for the printer, scanner, digital camera, card reader/writer and the like, a construction having no physical interface other than the USB interface can be realized.

However, in the foregoing conventional image processing system, in which the main control unit is connected with the sub control unit of the data processing unit/processor through the USB interface, in order to simplify the control and improve a throughput, a status (status data) generated by the sub control unit is notified to an external processing apparatus without being changed by the main control unit.

Therefore, data managed by the main control unit cannot be notified to the external processing apparatus.

SUMMARY OF THE INVENTION

The present invention has been made in consideration of the above situation, and has as its object to notify an external processing apparatus of status data including data managed by the main control unit, when an inquiry about status data of the sub control unit is received from the external processing apparatus.

According to the present invention, the foregoing object is attained by providing an image processing apparatus comprising: a first interface unit which connects with an external processing apparatus; a second interface unit, compliant with a same communication standard as the first interface unit, which connects with a data processing unit; and a control unit which controls data transfer between the first interface unit and the second interface unit, wherein the control unit notifies the data processing unit of management data, which is managed by the control unit, via the second interface unit, and the data processing unit generates status data of the data processing unit including the notified management data.

According to the present invention, the foregoing object is also attained by providing a control method of an image processing apparatus having: a first interface unit which connects with an external processing apparatus; a second interface unit, compliant with a same communication standard as the first interface unit, which connects with a data processing unit; and a control unit which controls data transfer between the first interface unit and the second interface unit, the method comprising: notifying the data processing unit of management data, which is managed by the control unit, via the second interface unit; and generating by the data processing unit status data of the data processing unit including the notified management data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a conceptual view showing a USB configuration of the image processing apparatus according to the embodiment of the present invention;

DETAILED DESCRIPTION OF THE PREFERRED EMBODIMENT

A preferred embodiment of the present invention will be described in detail in accordance with the accompanying drawings.

Figure 1:
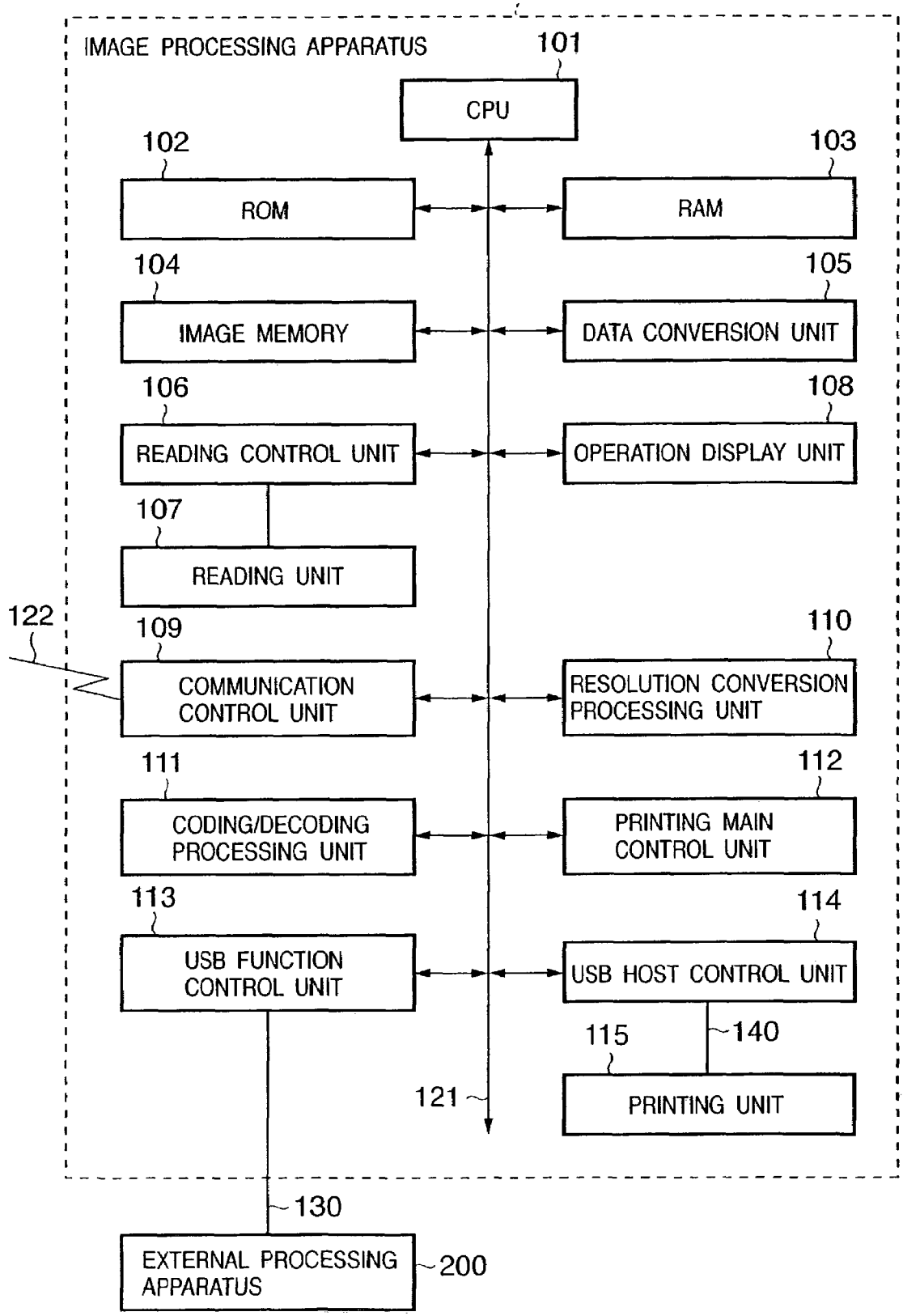
FIG. 1 is a block diagram showing a construction of an image processing apparatus according to an embodiment of the present invention.

First, a brief construction of an image processing apparatus 100, which constitutes an image processing system according to the embodiment of the present invention, is described in detail with reference to FIG. 1.

In the image processing apparatus 100, a CPU 101 serving as a system controller controls the entire image processing apparatus 100. The CPU 101 also controls a USB host control unit 114 for notifying a printing unit 115 of detailed information related to a printing operation of the image processing apparatus 100, and acquiring status data of the printing unit 115 on a regular basis. ROM 102 stores control programs and an incorporated operating system (OS) program or the like, which are executed by the CPU 101. In this embodiment, each of the control programs stored in the ROM 102 realizes software controlling, e.g., scheduling, task switch and so on, under the control of the incorporated OS stored in the ROM 102.

RAM 103, configured with SRAM (static RAM) or the like, stores program control variables or the like, and setting values registered by an operator as well as control data of the image processing apparatus 100, and so on, and includes a buffer area for various works. Image memory 104, configured with DRAM (dynamic RAM) or the like, stores image data.

A data conversion unit 105 performs image data conversion, such as interpretation of a page description language (PDL) or the like, CG (computer graphics) development of character data, and so on.

A reading control unit 106 performs various image processing, e.g., binarization, halftone processing or the like, on an image signal obtained by a reading unit 107, which optically reads an original document with the use of a contact image sensor (CIS) and converts the read data to electric image data, through an image processing control unit (not shown) and outputs high-definition image data. Note in this embodiment, the reading control unit 106 is adaptable to both a sheet-reading control method, which performs reading while conveying an original document, and a book-reading control method, which scans an original document placed on a platen.

An operation display unit 108 includes numeric keys, character keys, one-touch telephone number keys, mode setting keys, an OK key, a cancel key and so on. The operation display unit 108 is constructed with an operation unit, which is provided for a user to designate a copying operation, report output, or cartridge exchange, decide an image transmission destination, and perform registration operation of setting data; various keys; a light-emitting diode (LED); a liquid crystal display (LCD); and a display unit, which displays operator's various input operations and an operation state or status of the image processing apparatus 100.

A communication control unit 109 is constructed with a modulator-demodulator (MODEM), a network control unit (NCU) and so on. In this embodiment, the communication control unit 109 is connected with an analogue communication line (PSTN) 122 to perform, for instance, communication control according to the T30 protocol, or perform line control such as call out and call in of the communication line. Note that the types of communication line and communication protocol are not limited to those mentioned above, but regardless of wired or wireless, an available communication line and communication protocol may be employed.

A resolution conversion processing unit 110 performs resolution conversion control, such as millimeter-to-inch resolution conversion of image data. Note that in the resolution conversion processing unit 110, enlargement/reduction processing of image data is possible. A coding/decoding processing unit 111 performs coding/decoding processing on image data (MH, MR, MMR, JBIG, JPEG or the like) handled by the image processing apparatus 100, or performs enlargement/reduction processing.

A printing main control unit 112 performs various image processing, e.g., smoothing, print density correction, color correction and so on, on image data subjected to printing through an image processing control unit (not shown), and converts the data to high-definition image data to be outputted to a USB host control unit 114 (to be described later).

A USB function control unit 113, which performs communication control of a USB interface 130, performs protocol control according to the USB communication standard, converts data transmitted from a USB control task executed by the CPU 101 into packets, and transmits the USB packets to an external data processing terminal, or inversely, converts USB packets from an external data processing terminal into data and transmits the data to the CPU 101.

The USB host control unit 114 is a control unit for performing communication according to a protocol defined in the USB communication standard. The USB communication standard, capable of high-speed two-way data communication, can connect one host (master) with a plurality of hubs or functions (slaves). The USB host control unit 114 serves as the host in the USB communication.

The printing unit 115, which is a printing device configured with a laser beam printer, inkjet printer or the like, prints color image data or monochrome image data on a printing material. In this embodiment, the USB communication for using a printing function adopts a one-to-one connection form.

The aforementioned components 101 to 106 and 108 to 114 are connected to each other through a CPU bus 121 controlled by the CPU 101.

The USB interface 130 serves to connect the image processing apparatus 100 with an external processing apparatus 200. A USB interface 140 serves to connect the USB host control unit 114 with the printing unit 115 in the image processing apparatus 100.

Next, a brief configuration of the printing unit 115 in the image processing apparatus 100 is described in detail.

Figure 2:
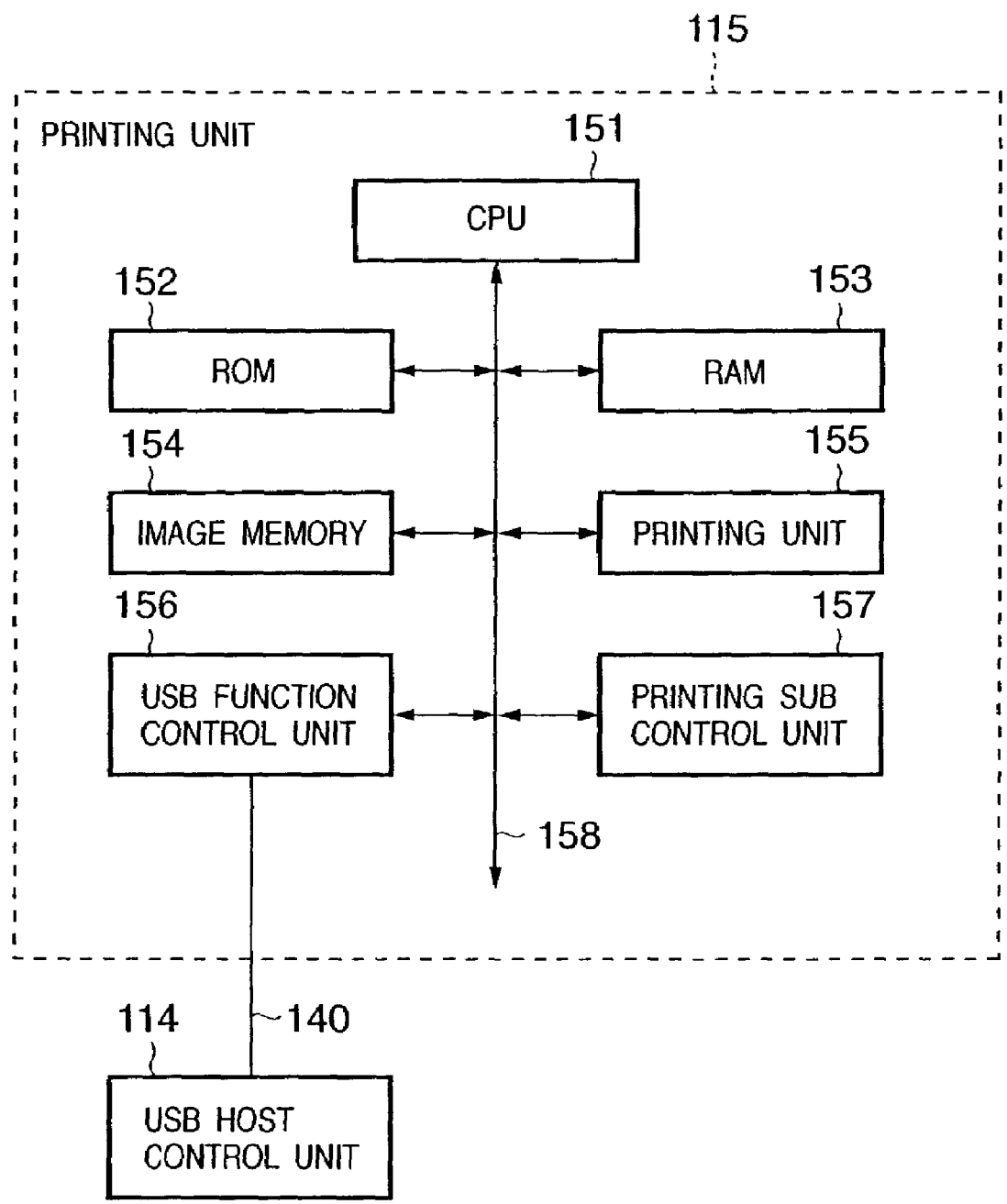
FIG. 2 is a block diagram showing a construction of a printing unit according to the embodiment of the present invention.

FIG. 2 is a block diagram showing a brief configuration of the printing unit 115 included in the image processing apparatus 100 according to the embodiment of the present invention.

In the printing unit 115, a CPU 151 serving as a system controller controls the entire printing unit 115. The CPU 151 performs controlling for storing detailed information related to a printing operation, notified by the image processing apparatus 100, in RAM 153, and transmitting data indicative of printing statuses and other information such as error information to the image processing apparatus 100. ROM 152 stores control programs and an incorporated operating system (OS) program or the like, which are executed by the CPU 151. In this embodiment, each of the control programs stored in the ROM 152 realizes software controlling, e.g., scheduling, task switch and so on, under the control of the incorporated OS stored in the ROM 152.

The RAM 153, configured with SRAM (static RAM) or the like, stores program control variables or the like and management data of the printing unit 115. In the RAM 153, a buffer area for various works is provided. The RAM 153 also stores detailed information related to a printing operation, which is notified by the image processing apparatus 100. Image memory 154, configured with DRAM (dynamic RAM) or the like, stores image data subjected to printing.

A printing unit 115, which is a printing device configured with a laser beam printer, inkjet printer or the like, prints color image data or monochrome image data on a printing material by the control of a printing sub control unit 157, which will be described later.

A USB function control unit 156, which performs communication control of a USB interface 140, performs protocol control according to the USB communication standard, converts data transmitted from a USB control task executed by the CPU 151 into packets, and transmits the USB packets to the USB host control unit 114, or inversely, converts USB packets from the USB host control unit 114 into data and transmits the data to the CPU 151.

A printing sub control unit 157 performs various image processing and enlargement/reduction processing on image data subjected to printing through an image processing controller (not shown), and outputs the data to the printing unit 155.

The aforementioned components 151 to 157 are connected to each other through a CPU bus 158 controlled by the CPU 151.

Figure 3:
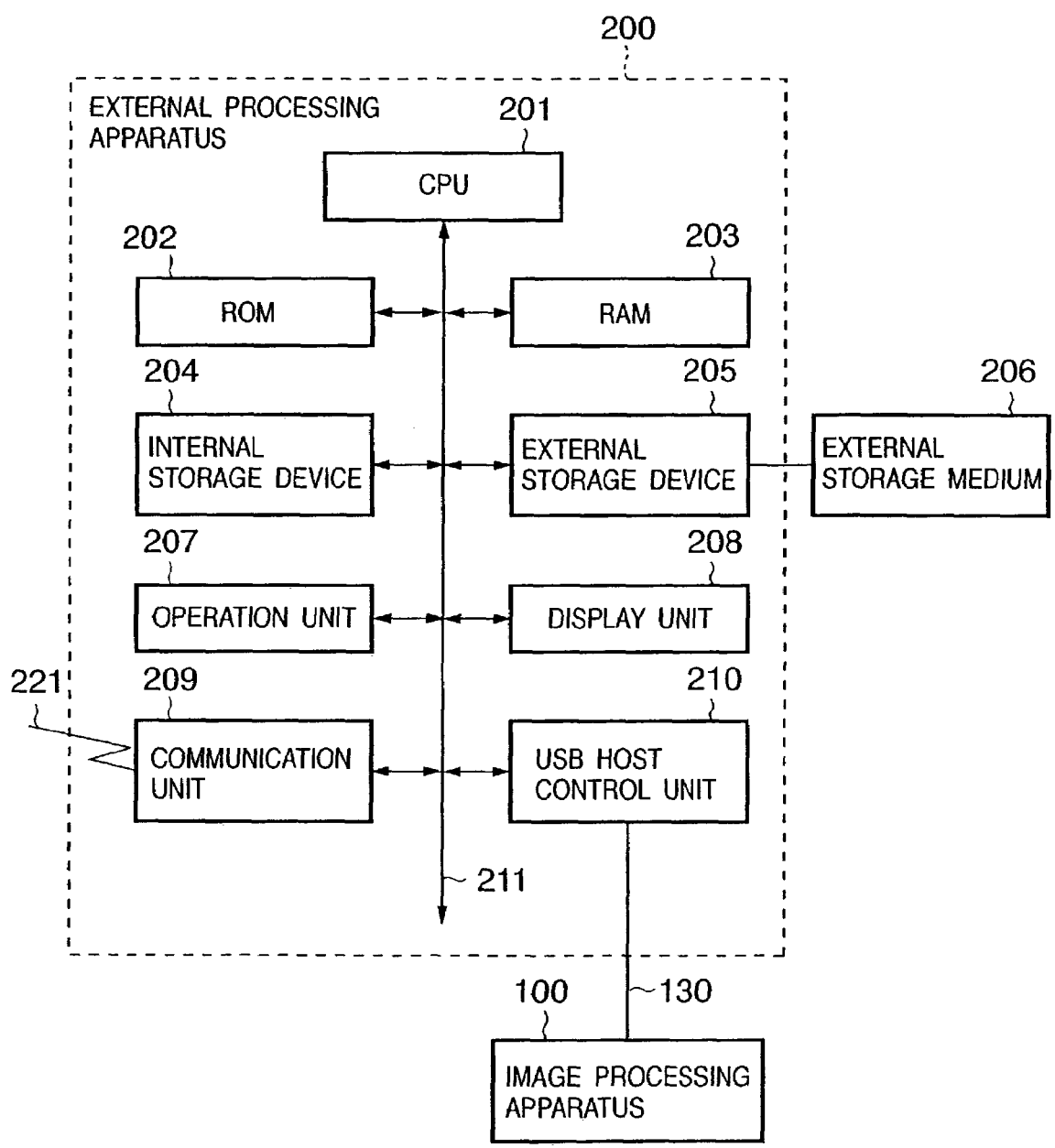
FIG. 3 is a block diagram showing a construction of an external processing apparatus according to the embodiment of the present invention.

Next, a brief construction of an external processing apparatus 200, e.g., a data processing terminal, which constitutes the image processing system together with the image processing apparatus 100, is described with reference to FIG. 3.

A CPU 201 controls the entire operation of the external processing apparatus 200 through a system bus, according to a program which is read out of ROM 202, RAM 203, or an internal storage device 204, or a program read out of an external storage medium 206 by an external storage device 205.

The ROM 202 stores a control program or the like of the CPU 201. The RAM 203 temporarily stores a program or image data to enable high-speed processing of the external processing apparatus 200.

The internal storage device 204 stores an operating system (OS), various application programs, image data and so on. Assume that the internal storage device 204 is installed with application software for transmitting/receiving various control commands and data to/from the image processing apparatus 100, which include character data processing steps according to the present embodiment, printer driver software, scanner driver software, facsimile driver software, USB-class driver software for each function, USB bus driver software and so forth. Normally, these application software and driver software are installed by receiving data from the external storage medium 206 (medium such as a floppy disk or CD-ROM), and controlling the external storage device 205. Alternatively, the application software and driver software can be received by a communication unit 209 (network or modem) through a communication line 221 and installed in the internal storage device 204.

An operation unit 207 controls a keyboard or a mouse (not shown), which serves as operator's designation input means. To execute printing, normally the keyboard and mouse of the operation unit 207 are used.

A display unit 208 performs various displaying for an operator. In a case where printing execution is designated by the external processing terminal 200, a confirmation dialogue or the like is displayed on the display unit 208 to prompt an operator to input. Further, during execution of a printing operation, data indicative of print statuses is provided to the operator.

During a printing operation of the image processing apparatus as a standalone apparatus or during cartridge exchange (hereinafter referred to as local printing), the display unit 208 provides an operator with information indicative of detailed statuses of the image processing apparatus (e.g., copying operation in progress, facsimile-received data output in progress, report output in progress, cartridge being exchanged, and the like). If a printing operation is attempted from a personal computer (PC), the display unit 208 displays a warning message, indicating the local printing in progress, and prompts an operator to standby or cancel the printing.

The communication unit 209 realizes connection with a network (not shown), realizes connection with an Internet provider through a communication line, or performs communication of data, image data or the like with a destination communication apparatus. Note with respect to connection with a network or a communication line, assume that a well-known method is used; thus a description thereof is omitted.

A USB host control unit 210, which performs communication control of the USB interface 130, converts data from the CPU 201 into packets in accordance with the USB communication standard and transmits the USB packets to the image processing apparatus 100, or inversely, converts USB packets from the image processing apparatus 100 into data and transmits the data to the CPU 201. With respect to a communication control method, assume that a well-known communication control method is used; thus a description thereof is omitted. The aforementioned components 201 to 205 to 207 to 210 are connected to each other through a CPU bus 211 controller by the CPU 210.

FIG. 4 is a conceptual view showing a configuration of the image processing apparatus 100 according to the embodiment of the present invention. The expression of the configuration is compliant with the communication standard of the USB interface 130. The USB function control unit 113 controls the USB interface 130 according to this configuration.

A device 301 represented by the largest frame can be defined solely in the USB communication standard, and indicates an attribute of the entire apparatus. The apparatus mentioned herein corresponds to the image processing apparatus 100. The attribute of the device 301 is expressed by a device descriptor, which includes an apparatus manufacturer ID, a product ID, a release number, the number of configurations and so forth. In this embodiment, the number of configurations is "1".

Accordingly, in the device 301, only one configuration (configuration 1 (302)) is defined. An attribute of the configuration 1 (302) is expressed by a configuration descriptor, which includes the number of interfaces in the configuration. In this embodiment, the number of interfaces is "3".

Accordingly, in the configuration 1 (302), three interfaces (interfaces 0 to 2 (304, 307, 311)) are defined. Attributes of the interfaces 0 to 2 (304, 307, 311) are expressed by an interface descriptor, which includes the number of endpoints in the interface, a class code and so forth. In this embodiment, the number of endpoints in the interface 0 (304) used for a printer is "2"; the number of endpoints in the interface 1 (307) used for a scanner is "3"; and the number of endpoints in the interface 2 (311) used for FAX transmission/reception is "3".

Accordingly, in the interface 0 (304) used for a printer, two endpoints (endpoints 1 and 2 (305, 306)) are defined. Attributes of the endpoints 1 and 2 (305, 306) are expressed by an endpoint descriptor, which includes an endpoint number of the endpoint, a communication direction, the type of transfer, a packet size and so forth. The endpoint 1 (305) is used mainly for receiving control data and print data. The endpoint 2 (306) is used mainly for transmitting a print status of received print data.

Furthermore, in the interface 1 (307) used for a scanner, three endpoints (endpoints 3, 4 and 5 (308, 309, 310)) are defined. Attributes of the endpoints 3, 4 and 5 (308, 309, 310) are expressed by an endpoint descriptor, which includes an endpoint number of the endpoint, a communication direction, the type of transfer, a packet size and so forth. The endpoint 3 (308) is used mainly for transmitting read data. The endpoint 4 (309) is used mainly for receiving control data. The endpoint 5 (310) is used mainly for informing a start of scanning.

Furthermore, in the interface 2 (311) used for FAX transmission/reception, three endpoints (endpoints 6, 7 and 8 (312, 313, 314)) are defined. Attributes of the endpoints 6, 7 and 8 (312, 313, 314) are expressed by an endpoint descriptor, which includes an endpoint number of the endpoint, a communication direction, the type of transfer, a packet size and so forth. The endpoint 6 (312) is used mainly for receiving control data and FAX transmission data. The endpoint 7 (313) is used mainly for transmitting FAX reception data and a communication state of FAX transmission/reception. The endpoint 8 (314) is used mainly for informing an end of FAX reception.

Figure 5:
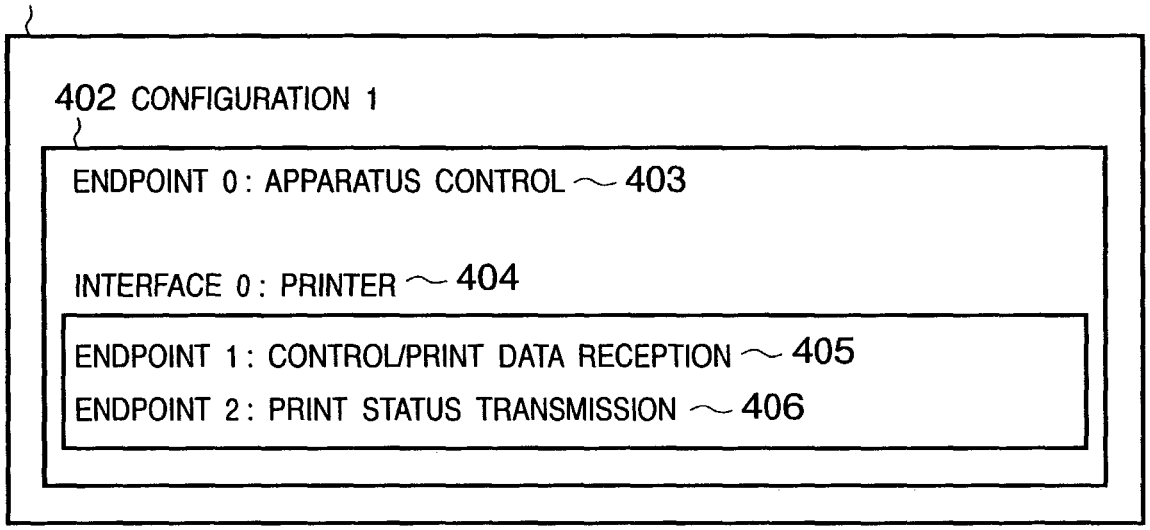
FIG. 5 is a conceptual view showing a USB configuration of the printing unit according to the embodiment of the present invention.

FIG. 5 is a conceptual view showing a configuration of the printing unit 115 according to the embodiment of the present invention. The expression of the configuration is compliant with the communication standard of the USB interface 140.

A device 401 represented by the largest frame can be defined solely in the USB communication standard, and indicates an attribute of the entire apparatus. The apparatus mentioned herein corresponds to the printing unit 115. The attribute of the device 401 is expressed by a device descriptor, which includes an apparatus manufacturer ID, a product ID, a release number, the number of configurations and so forth. In this embodiment, the number of configurations is "1".

In the device 401, only one configuration (configuration 1 (402)) is defined. An attribute of the configuration 1 (402) is expressed by a configuration descriptor, which includes the number of interfaces in the configuration. In this embodiment, the number of interfaces is "1".

Accordingly, in the configuration 1 (402), only one interface (interface 0 (404)) is defined. An attribute of the interface 0 (404) is expressed by an interface descriptor, which includes the number of endpoints in the interface, a class code and so forth. In this embodiment, the number of endpoints in the interface 0 (404) used for printing is "2".

Accordingly, in the interface 0 (404) used for printing, two endpoints (endpoints 1 and 2 (405, 406)) are defined. Attributes of the endpoints 1 and 2 (405, 406) are expressed by an endpoint descriptor, which includes an endpoint number of the endpoint, a communication direction, the type of transfer, a maximum packet size and so forth. The endpoint 1 (405) is used mainly for receiving control data and print data. The endpoint 2 (406) is used mainly for transmitting a print status of received print data.

Figure 6:
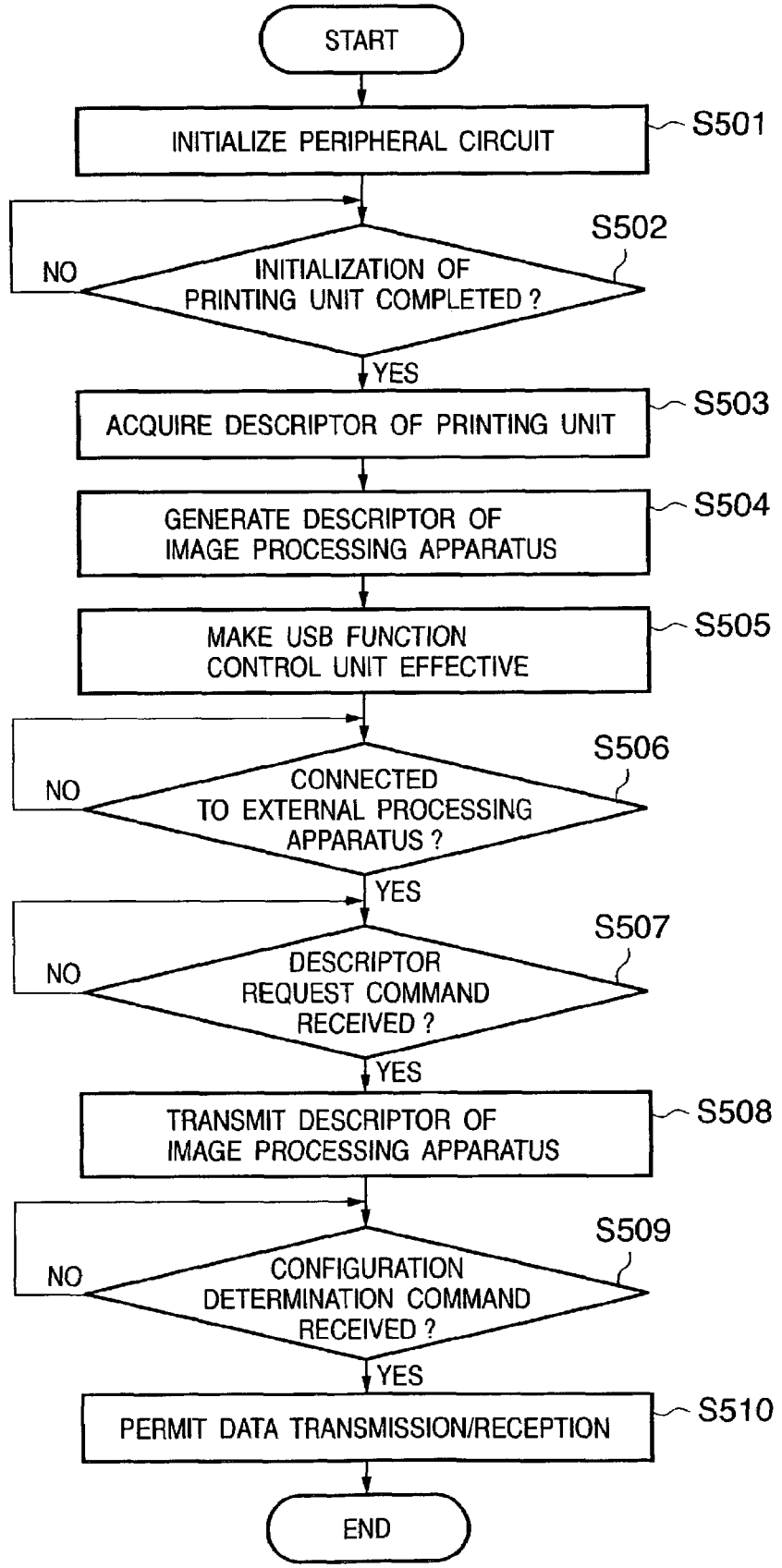
FIG. 6 is a flowchart describing an initialization operation of the image processing apparatus according to the embodiment of the present invention.

Next, an initialization processing of the image processing apparatus 100, having the above-described construction, is described in detail with reference to the flowchart in FIG. 6. The initialization processing is executed by the CPU 101.

When the power of the image processing apparatus 100 is turned on, the peripheral circuits connected with the CPU bus 121 are initialized in step S501.

In step S502, it is determined whether or not initialization of the printing unit 115 has been completed. If YES, the control proceeds to step S503. If NO, step S502 is repeated. Initialization completion of the printing unit 115 can be detected by the USB interface 140 of the USB host control unit 114. It can also be detected by directly connecting the CPU 101 with the printing unit 115 by a monitoring line.

In step S503, the CPU 101 acquires data indicative of the apparatus configuration of the printing unit 115, which is detected by the USB host control unit 114, and transmits an apparatus configuration determination command (Set_Configuration command) to the printing unit 115 to be activated.

For the acquisition of apparatus configuration data of the printing unit 115, the USB interface 140 is employed. The apparatus configuration data is transmitted or received via a logical channel of the endpoint 0 (403) shown in FIG. 5, which is used for apparatus controlling. The apparatus configuration data of the printing unit 115 includes the above-described device descriptor, configuration descriptor, interface descriptor, endpoint descriptors (1, 2) and so on, and further includes character strings representing a manufacturer of the printing unit 115, a product name, a serial number and so on. For transmission of the apparatus configuration determination command to the printing unit 115, the USB interface 140 is employed. The apparatus configuration determination command data is transmitted via the logical channel of the endpoint 0 (403) shown in FIG. 5, which is used for apparatus controlling. By executing the foregoing steps at the time of power-on initialization of the image processing apparatus 100, it is possible to assure initialization of the image processing apparatus 100. Moreover, when the apparatus configuration data of the entire image processing apparatus 100 is informed to the external processing apparatus 200, it is possible to respond quickly to an apparatus configuration data acquisition command transmitted from the external processing apparatus 200.

In step S504, apparatus configuration data of the entire image processing apparatus 100 is generated. The apparatus configuration data is transmitted or received via a logical channel of the endpoint 0 (303) shown in FIG. 4, which is used for apparatus controlling. The apparatus configuration data of the entire image processing apparatus 100 includes the above-described device descriptor, configuration descriptor, interface descriptors (0 to 2), endpoint descriptors (1 to 8) and so on, and further includes character strings representing a manufacturer of the entire image processing apparatus 100, a product name, a serial number and so on.

As a part of the apparatus configuration data of the entire image processing apparatus 100, the part of the apparatus configuration data of the printing unit 115 acquired in step S503 is used. For instance, the interface descriptor 0 (304) used for a printer, shown in FIG. 4, is formed to have the same configuration of the interface descriptor received from the printing unit 115 in step S503, so that print data transmitted from the external processing apparatus 200 to the image processing apparatus 100 through the USB interface 130 can be transferred to the printing unit 115 through the USB interface 140 without a change, and print status data (status information) transmitted from the printing unit 115 to the USB host control unit 114 through the USB interface 140 can be transferred to the external processing apparatus 200 through the USB interface 130 without a change.

By virtue of the aforementioned control, it is possible to configure the image processing apparatus 100 independent of the type of printing unit 115. More specifically, even in a case where the printing unit 115 is changed to a latest printing unit, the processing steps shown in the flowchart in FIG. 6 need not be changed.

In step S505, to permit communication between the image processing apparatus 100 and external processing apparatus 200, the USB function control unit 113 is shifted to a communication effective state. By this stage, initialization of the entire image processing apparatus 100 ends, and the apparatus holds an event-wait state in a standby state.

In step S506, it is determined whether or not the image processing apparatus 100 is connected with the external processing apparatus 200. If YES, the control proceeds to step S507. If NO, step S506 is repeated. The detection of the connection between the image processing apparatus 100 and external processing apparatus 200 can be performed by the USB interface 130 of the USB function control unit 113.

In step S507, it is determined whether or not an apparatus configuration data acquisition command (e.g., Get_Device_Descriptor command, Get_Configuration_Descriptor command, Get_String_Descriptor command, Get_Device_ID command) is received from the external processing apparatus 200 which is connected with the image processing apparatus 100. If YES, the control proceeds to step S508. If NO, step S507 is repeated.

In step S508, the CPU 101 informs the external processing apparatus 200 of the apparatus configuration data of the entire image processing apparatus 100, which is generated in step S504. The apparatus configuration data is transmitted via the logical channel of the endpoint 0 (303) shown in FIG. 4, which is used for apparatus controlling.

In step S509, it is determined whether or not the image processing apparatus 100 has received an apparatus configuration determination command (Set_Configuration command) from the external processing apparatus 200. If YES, the control proceeds to step S510. If NO, step S509 is repeated. The apparatus configuration determination command is received via the logical channel of the endpoint 0 (303) shown in FIG. 4, which is used for apparatus controlling.

In step S510, the image processing apparatus 100 makes the apparatus configuration usable, and shifts to a print-data-reception standby state.

At this stage, if there is an error of some kind in the printing unit 115, such as no ink, no toner, no printing paper, paper jamming or the like, and the printing unit 115 is not ready to receive the print data, the USB function control unit 113 is set in the state that print data reception from the external processing apparatus 200 is not ready. For instance, if the printing unit 115 detects a crucial error in the printing unit 115 at the time of initializing the printing unit 115 in step S502, the printing unit 115 sets the USB function control unit 156 in the state where print data cannot be received. The CPU 101, which detects this state through the USB host control unit 114 in step S503, sets the USB function control unit 113 in step S504 in the state where print data reception is not ready, and informs the external processing apparatus 200 of this state in step S508. By virtue of this control, the external processing apparatus 200 can be informed that the printing unit 115 is not ready to receive print data. Accordingly, since the print data from the external processing apparatus 200 is no longer stored and retained in the image memory 104, operation troubles can be prevented.

Moreover, also in a case where a similar error occurs in the printing unit 115 in a standby state after initialization or after completion of printing operation, the state where print data reception is not ready is set in the USB function control unit 113 to achieve the similar effect.

Furthermore, the above description also applies to a case where the printing unit 115 is not ready to transmit data indicative of print statuses. If there is an error of some kind in the printing unit 115 and the printing unit 115 is not ready to transfer the data indicative of print statuses, the USB function control unit 113 is set in the state that print-status-data transfer to the external processing apparatus 200 is not ready. For instance, if the printing unit 115 detects a crucial error in the printing unit 115 at the time of initializing the printing unit 115 in step S502, the printing unit 115 sets the USB function control unit 156 in the state where data indicative of print statuses cannot be transferred. The CPU 101, which detects this state through the USB host control unit 114 in step S503, sets the USB function control unit 113 in step S504 in the state where print-status-data transfer is not ready. By virtue of this control, even in a case where a transfer request of the data indicative of print statuses is transmitted by the external processing apparatus 200, the external processing apparatus 200 can be informed that the printing unit is not ready to transfer data indicative of print statuses by returning the state where print-status-data transfer is not ready to the external processing apparatus 200. Accordingly, operation troubles in the processing can be prevented.

Moreover, also in a case where a similar error occurs in the printing unit 115 in a standby state after initialization or after completion of printing operation, the state where print-status-data transfer is not ready is set in the USB function control unit 113 to achieve the similar effect.

Note that steps S503 and S504 are not necessarily performed immediately after step S502. For instance, processing of steps S503 and S504 may be performed immediately after the connection between the image processing apparatus 100 and external processing apparatus 200 is confirmed in step S506. In this case, it is possible to reduce the power-on initialization processing of the image processing apparatus 100, thereby reducing the time lag between the power-on and apparatus-ready state of the image processing apparatus 100.

Alternatively, steps S503 and S504 may be performed immediately after the apparatus configuration data acquisition command is received from the external processing apparatus 200 connected with the image processing apparatus 100 in step S507. In this case, until the apparatus configuration data acquisition command is received, it is not necessary to acquire apparatus configuration data of the printing unit 115 or generate apparatus configuration data of the entire image processing apparatus 100. Therefore, an algorithm of the control program can be simplified.

Furthermore, in step S503, the acquisition of the apparatus configuration data from the printing unit 115 and the transmission of the apparatus configuration determination command to the printing unit 115 are not necessarily performed simultaneously. For instance, the transmission of the apparatus configuration determination command to the printing unit 115 may be executed at the timing that print data is received from the external processing apparatus 200. In this case, by virtue of separately performing the acquisition of the apparatus configuration data from the printing unit 115 and the transmission of the apparatus configuration determination command to the printing unit 115, an effect of clarified algorithm of the control program can be expected.

Next, printing operation of the image processing apparatus 100 is described in detail with reference to FIGS. 7 to 10.

Figure 7:
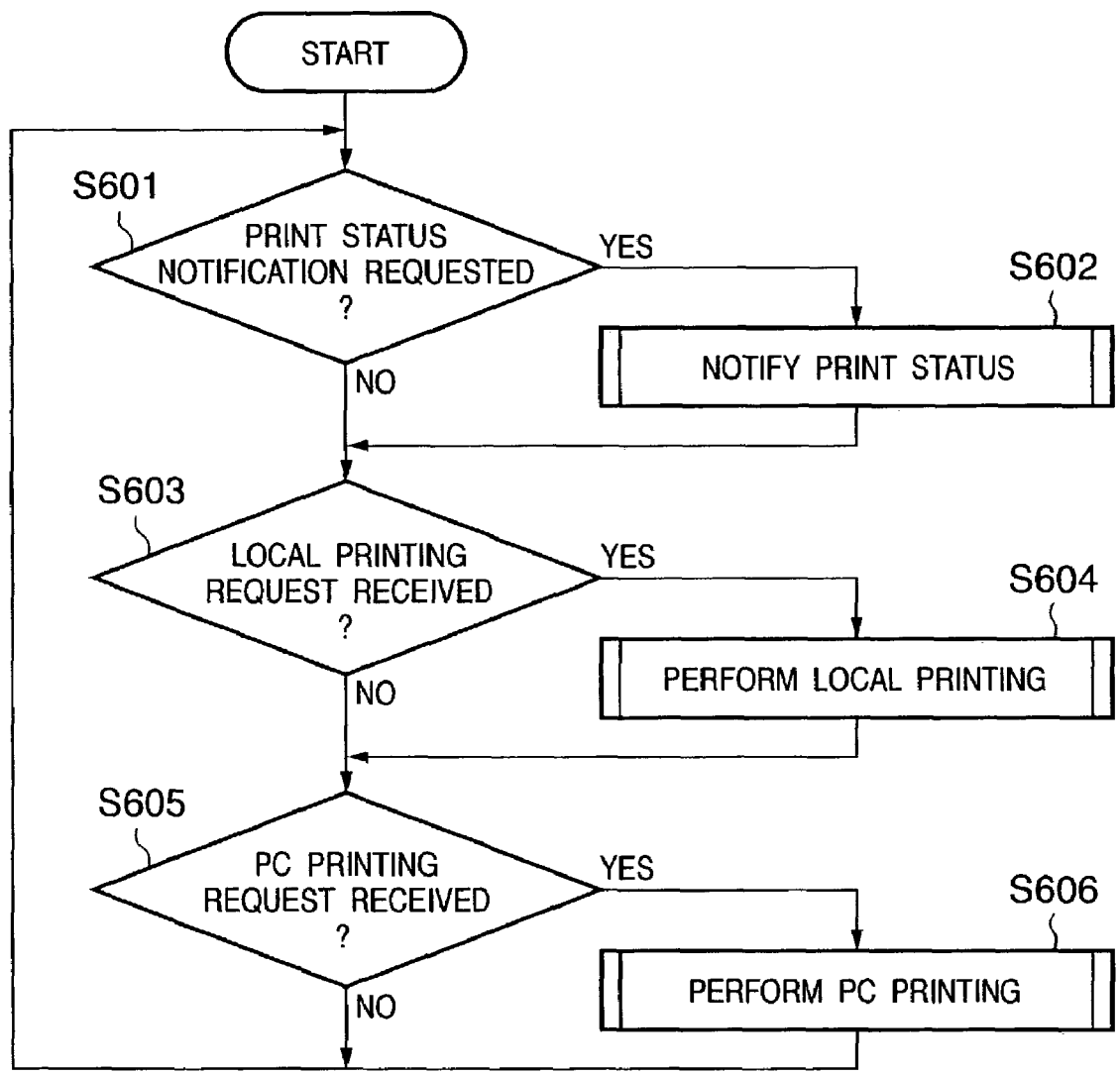
FIG. 7 is a flowchart describing a print-operation start procedure according to the embodiment of the present invention.

FIG. 7 is a flowchart describing print-operation start of the image processing apparatus 100, which is executed by the CPU 101.

In step S601, it is determined whether or not the image processing apparatus 100 has received a print status notification request from the external processing apparatus 200. If YES, the control proceeds to step S602. If NO, the control proceeds to step S603. The print status notification request is received via the logical channel of the endpoint 2 (306) shown in FIG. 4, which is used for print status transmission. Note that the reception of a print status notification request is not reception of actual data, but is reception of an IN packet compliant with the USB communication standard.

In step S602, the image processing apparatus 100 receives the data indicative of print statuses from the printing unit 115, and transfers the received print status data to the external processing apparatus 200. Herein, the data indicative of print statuses is information representing whether printing of the printing unit 115 is in progress or completed, and if printing is in progress, contents of the printing (printing a copied image, received FAX data, report data, or an image sent from a PC), the residual amount of toner or ink in the printing unit 115, a print error state of the printing unit 115, the remaining amount of memory in the printing unit 115, and so forth. Detailed data transfer processing of print statuses will be described later. Upon completion of step S602, the control proceeds to step S603.

In step S603, it is determined whether or not a local printing request is received. The determination is made based on whether or not there is a designation of a copying operation, report output, or cartridge exchange from the operation display unit 108 operated by an operator, and whether or not there is a FAX image received from another communication apparatus through the communication line 122. If it is determined in step S603 that the printing unit 115 needs to perform local printing, then in step S604, local printing (described later) is performed, and the control proceeds to step S605. If local printing is not necessary, the control proceeds to step S605.

In step S605, it is determined whether or not a PC printing request is received. The determination is made based on whether or not the image processing apparatus 100 has received print data from the external processing apparatus 200. If YES, the control proceeds to step S606. If NO, the control returns to step S601. Print data is received via the logical channel of the endpoint 1 (305) shown in FIG. 4, which is used for receiving control data and print data. The print data is received in a packet form delimited in a predetermined length.

If the image processing apparatus 100 has received print data from the external processing apparatus 200 in step S605, PC printing is performed in step S606 for printing the received print data. Details of the PC printing will be described later. Upon completion of the PC printing, the control returns to step S601.

Next, an operation of the local printing executed by the CPU 101 of the image processing apparatus 100, which is performed in step S604, is described in detail with reference to the flowchart in FIG. 8.

In step S701, starting processing is performed. In the starting processing, the CPU 101 performs initialization of the printing unit 115 and transmits detailed information about the local printing (e.g., copying operation in progress, facsimile-received data output in progress, report output in progress, cartridge being exchanged, and the like) to the logical channel of the endpoint 1 (405) shown in FIG. 5, which is used for receiving control data and print data. It may be constructed to use the endpoint 0 (403) in place of the endpoint 1 (405). The detailed information is stored in the RAM 153 of the printing unit 115, and is notified to the external processing apparatus 200 along with other print status information of the printing unit 115, e.g., error information, when a print status notification request is received in step S704 or S803, which will be described later.

In step S702, the CPU 101 determines whether or not there is data to be printed in the image memory 104. If YES, the control proceeds to step S703. If NO, the control proceeds to step S704.

In step S703, print data transfer to the printing unit 115 is performed. More specifically, the data to be printed is transferred to the logical channel of the endpoint 1 (405) shown in FIG. 5, which is used for receiving control data and print data. The print data is transferred in a packet form delimited in a predetermined length. Upon completion of the processing in step S703, the control proceeds to step S704.

In step S704, it is determined whether or not the image processing apparatus 100 has received a print status notification request from the external processing apparatus 200. If YES, the control proceeds to step S705. If No, the control proceeds to step S706. As similar to step S601, the print status notification request is received via the logical channel of the endpoint 2 (306) shown in FIG. 4, which is used for print status transmission.

In step S705, the image processing apparatus 100 receives the data indicative of print statuses from the printing unit 115, and transfers the received data to the external processing apparatus 200. Detailed processing related to transferring the data indicative of print statuses will be described later. Upon completion of the processing in step S705, the control proceeds to step S706.

In step S706, the CPU 101 determines whether or not local printing has been completed. If YES, the control proceeds to step S707. If NO, the control proceeds to step S702.

In step S707, print-operation completion processing is performed. Print-operation completion processing includes discharging a printing material outside the apparatus, sounding print-operation completion alarm from a speaker (not shown), informing print-operation completion by the operation display unit 108 or display unit 208, and so forth. Furthermore, the CPU 101 transmits information about the local printing completion to the logical channel of the endpoint 1 (405) shown in FIG. 5, which is used for receiving control data and print data. It may be constructed to use the endpoint 0 (403) in place of the endpoint 1 (405). This completion information causes to clear the detailed information of local printing, which is stored in the RAM 153 of the printing unit 115 in step S701.

Figure 9:
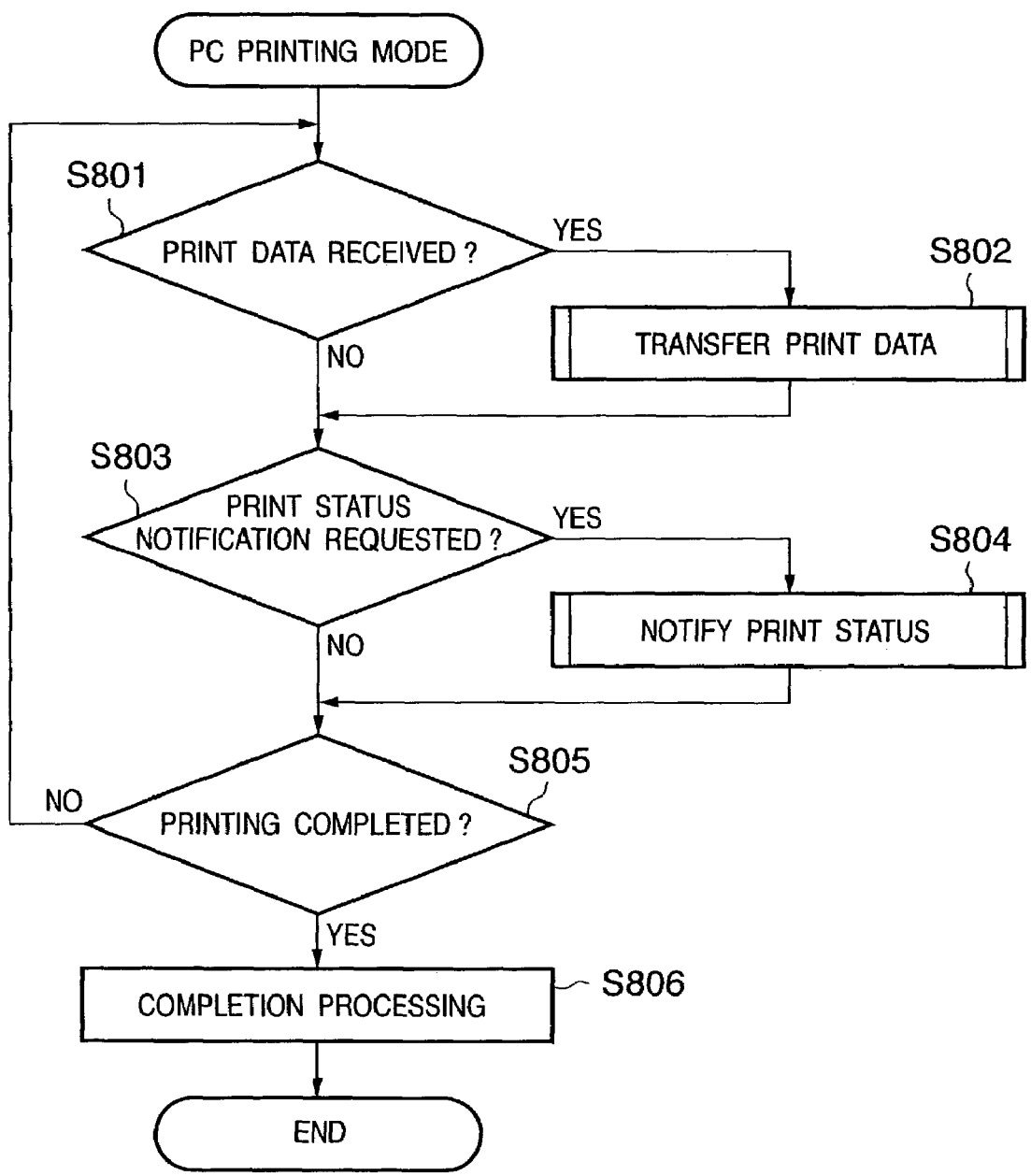
FIG. 9 is a flowchart describing a PC printing procedure according to the embodiment of the present invention.

FIG. 9 is a flowchart describing PC printing operation of the image processing apparatus 100 executed by the CPU 101, which is performed in step S606 of FIG. 7.

First, in step S801, it is determined whether or not the image processing apparatus 100 has received print data from the external processing apparatus 200. If YES, the control proceeds to step S802. If NO, the control proceeds to step S803. The print data is received via the logical channel of the endpoint 1 (305) shown in FIG. 4, which is used for receiving control data and print data. The received print data is temporarily stored in the image memory 104 of the image processing apparatus 100. The print data is received in a packet form, delimited in a predetermined length.

In step S802, the image processing apparatus 100 transfers the print data, received from the external processing apparatus 200 and stored in the image memory 104, to the printing unit 115. Details of the print data transfer will be described later. Upon completion of the processing in step S802, the control proceeds to step S803.

In step S803, it is determined whether or not the image processing apparatus 100 has received a print status notification request from the external processing apparatus 200. If YES, the control proceeds to step S804. If NO, the control proceeds to step S805. The print status notification request is received via the logical channel of the endpoint 2 (306) shown in FIG. 4, which is used for transmitting/receiving print statuses. Note that the reception of the print status notification request is not reception of actual data, but is reception of an IN packet compliant with the USB communication standard.

In step S804, the image processing apparatus 100 receives data indicative of print statuses from the printing unit 115, and transfers the received data indicative of print statuses to the external processing apparatus 200. Details of the print-status-data transfer will be described later. Upon completion of the processing in step S804, the control proceeds to step S805.

In step S805, it is determined whether or not print data from the external processing apparatus 200 has ended. If YES, the control proceeds to step S806. If NO, the control returns to step S801. The end of print data from the external processing apparatus 200 can be detected by analyzing only a part of the data indicative of print statuses, which is acquired in step S804, and determining whether printing operation is in progress or completed. Herein, the data indicative of print statuses is a series of character strings representing whether printing of the printing unit 115 is in progress or completed, and if printing is in progress, contents of the printing (printing a copied image, received FAX data, report data, or an image sent from a PC, and so forth), the residual amount of toner or ink in the printing unit 115, a print error state of the printing unit 115, the remaining amount of memory in the printing unit 115, and so forth. Analyzing a part of the data indicative of print statuses indicates the following processing. Namely, only a character string indicative of whether printing of the printing unit 115 is in progress or completed is extracted from the data indicative of print statuses of the printing unit 115, which is temporarily stored in the RAM 103 of the image processing apparatus 100, and analyzed as to whether the printing is in progress or completed. Herein, the data indicative of print statuses of the printing unit 115 is not analyzed entirely. According to this determination method, since data indicative of print statuses is not entirely analyzed, but only a character string indicative of whether printing of the printing unit 115 is in progress or completed is extracted and analyzed, it is possible to assure detection of print completion while reducing a processing load of the CPU 101.

Note that the print data end detection method is not limited to the above-described method but, for instance, the following method is available. More specifically, print data from the external processing apparatus 200 is normally transmitted in a packet having a predetermined fixed length. For instance, it is often the case that 64 bytes are used as a transfer unit. However, print data from the external processing apparatus 200 does not always have a data length which is exactly divisible by 64 bytes. In this case, the last packet of the print data from the external processing apparatus 200 is naturally a short packet having less than 64 bytes. For instance, assume that a print data length is 100,000 bytes and a normally used packet length is 64 bytes. Dividing the total print data length 100,000 bytes by the packet length 64 bytes results in quotient 1,562 with remainder 32. Therefore, the CPU 101 transfers 1,562 64-byte packets and one short 32-byte packet. By detecting the last short packet, the end of print data can be detected. Furthermore, there may be a case where the total print data length is exactly divisible by 64 bytes. In this case, it is a general practice to transfer a null packet having 0 data length after all the print data is transferred. By detecting the null packet, the CPU 101 is able to detect print data end even in a case where the total print data length is exactly divisible by 64 bytes. According to this determination method, by merely monitoring a packet length of print data from the external processing apparatus 200, it is possible to assure detection of print completion, and a simplified processing program can be expected.

Alternatively, the following print data end detection method is possible. More specifically, referring to FIG. 9, when print data reception ends, the control no longer proceeds to step S802. The number of times the control directly proceeds from step S801 to S803 consecutively is counted, and when the counted number exceeds a predetermined value, the end of print data can be determined. According to this determination method, by merely counting the number of times the control directly proceeds from step S801 to S803 and determining whether or not a predetermined number of times has been counted, it is possible to assure detection of print completion, and a simplified processing program can be expected.

Furthermore, the following print data end detection method is possible. More specifically, referring to FIG. 9, when print data reception ends, the control no longer proceeds to step S802. The time period the control directly proceeds from step S801 to S803 consecutively is timed, and when the time period exceeds a predetermined time period, the end of print data can be determined. According to this determination method, by merely timing the time period the control directly proceeds from step S801 to S803 and determining whether or not a predetermined time period has lapsed, it is possible to assure detection of print completion, and a simplified processing program can be expected.

When print completion is determined in step S805, the control proceeds to step S806 where print-operation completion processing is performed. Print-operation completion processing includes discharging a printing material outside the apparatus, sounding print-operation completion alarm from a speaker (not shown), informing print-operation completion by the operation display unit 108 or display unit 208, and so forth.

Figure 10:
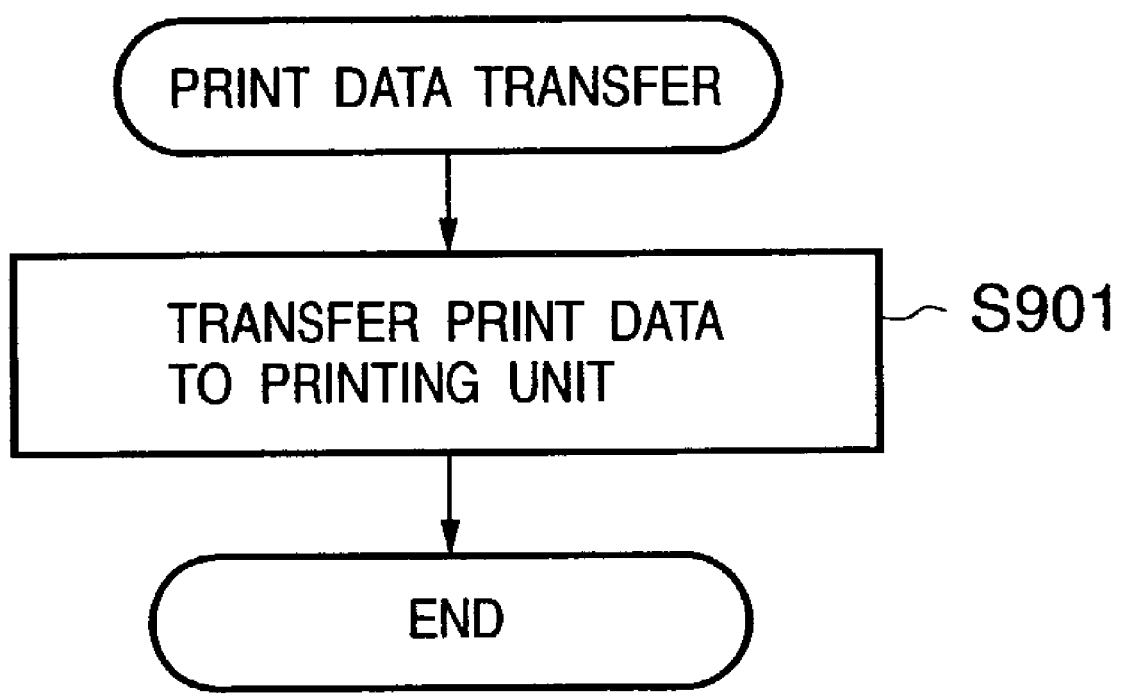
FIG. 10 is a flowchart describing transfer processing of print data according to the embodiment of the present invention.

FIG. 10 is a flowchart describing print data transfer processing of the image processing apparatus 100 executed by the CPU 101, which is performed in step S802 in FIG. 9.

In step S901, the print data received in step S801 is transferred to the printing unit 115. The CPU 101 temporarily stores in the image memory 104 of the image processing apparatus 100 the print data received via the logical channel of the endpoint 1 (305) shown in FIG. 4, which is used for receiving control data and print data, and transfers the data to the logical channel of the endpoint 1 (405) shown in FIG. 5, which is used for receiving control data and print data. At this stage, the CPU 101 transfers the print data as it is, without performing any editing or processing on the content of the print data transferred from the endpoint 1 (305) to the endpoint 1 (405). The print data is transferred in a packet form, delimited in a predetermined length. Note that the interface 0 (304) in the device 301 shown in FIG. 4 and interface 0 (404) in the device 401 shown in FIG. 5 are employed so that one can assume the other does not exist. More specifically, processing of the printer driver software installed in the external processing apparatus 200 is not at all different from the case where the external processing apparatus 200 is directly connected with the printing unit 115 through a USB interface. Therefore, in a case where the printing unit 115 is changed to a different one, the printer driver software for the changed printing unit can be used without a change.

Figure 8:
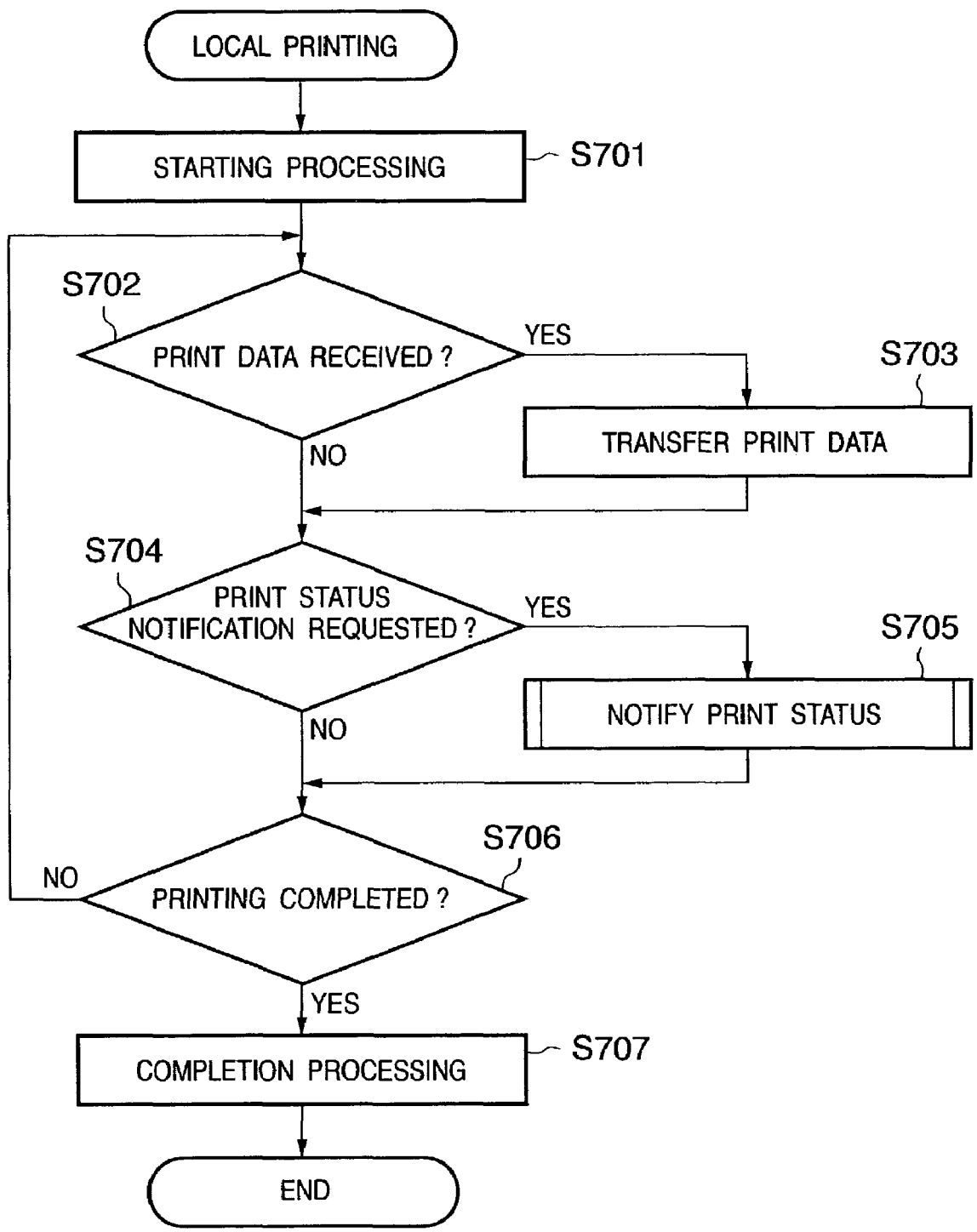
FIG. 8 is a flowchart describing a local printing procedure according to the embodiment of the present invention.
Figure 11:
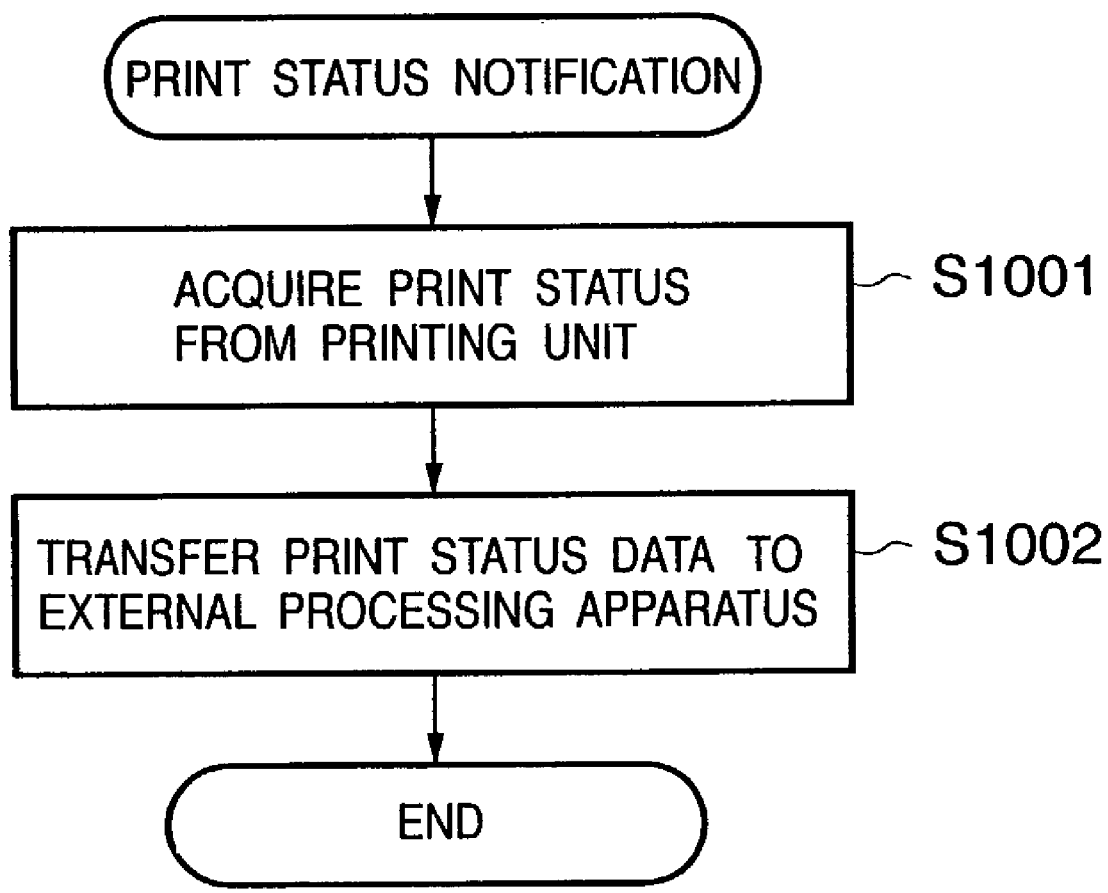
FIG. 11 is a flowchart describing transfer processing of print status data according to the embodiment of the present invention.

FIG. 11 is a flowchart describing print-status-data transfer processing of the image processing apparatus 100 executed by the CPU 101, which is performed in step S602 in FIG. 7, step S705 in FIG. 8, and step S804 in FIG. 9.

In step S1001, the CPU 101 acquires data indicative of print statuses from the printing unit 115 by controlling the USB host control unit 114. The data indicative of print statuses is acquired via the logical channel of the endpoint 2 (406) shown in FIG. 5, which is used for transmitting print statuses. The acquired data indicative of print statuses is temporarily stored in the RAM 103 of the image processing apparatus 100. Note that the acquired data indicative of print statuses has a packet form delimited in a predetermined length. It may be constructed such that the data indicative of print statuses is acquired from the printing unit 115 each time a print status notification request is transmitted from the external processing apparatus 200. Alternatively, it may be constructed such that the data is acquired from the printing unit 115 on a regular basis and stored in the RAM 103 of the image processing apparatus 100, so that the information stored in the RAM 103 is outputted whenever a print status notification request is transmitted from the external processing apparatus 200.

In step S1002, the CPU 101 transmits the data indicative of print statuses, which is temporarily stored in the RAM 103 of the image processing apparatus 100, to the logical channel of the endpoint 2 (306) shown in FIG. 4 which is used for transmitting/receiving print statuses. At this stage, the CPU 101 transfers the data indicative of print statuses as it is, without performing any editing or processing on the content of the data indicative of print statuses, which is transferred from the endpoint 2 (406) to the endpoint 2 (306).

By the foregoing process, in the external processing apparatus 200, it is possible to display in the display unit 208 detailed information about a print error state or a printing operation (e.g., copying operation in progress, facsimile-received data output in progress, report output in progress, cartridge being exchanged, and the like). Further, in a case where printing is attempted from a PC while a local printing operation is in progress, since the PC in general checks the state of the printing apparatus before the printing is actually started, or the PC actually starts transferring print data, it is possible to display an appropriate message to prompt an operator to standby or cancel the printing from the PC.

Furthermore, at this stage, by analyzing a part of the data indicative of print statuses which is temporarily stored in the RAM 103 of the image processing apparatus 100, print completion can be detected and used for the print completion determination in step S805 in FIG. 9. The print status data is transferred in a packet form, delimited in a predetermined length. Note that the interface 0 (404) in the device 401 shown in FIG. 5 and interface 0 (304) in the device 301 shown in FIG. 4 are employed so that one can assume the other does not exist. More specifically, processing of the printer driver software installed in the external processing apparatus 200 is not at all different from the case where the external processing apparatus 200 is directly connected with the printing unit 115 through a USB interface. Therefore, in a case where the printing unit 115 is changed to a different one, the printer driver software for the changed printing unit can be used without a change.

As has been set forth above, according to the configuration of the above-described embodiment where print statuses (status data) generated by the printing unit 115 are notified to the external processing apparatus 200 without being changed by the CPU 101, it is possible to notify the external processing apparatus of the management data which is managed by the CPU 101. Therefore, the external processing apparatus 200 can perform displaying of detailed statuses of the image processing apparatus 100, thus displaying appropriate information to users.

By virtue of this, while the image processing apparatus 100 as a standalone apparatus is using the printing unit 115, detailed printing statuses can be displayed on the external processing apparatus 200. For instance, in a case where the external processing apparatus 200 attempts to perform printing while the image processing apparatus 100 as a standalone apparatus is using the printing unit 115, it is possible to display an appropriate message to prompt an operator to standby or cancel the printing from the external processing apparatus 200.

Although the present embodiment has described a case where the printing unit is connected to the USB host control unit 114 via a unique USB interface, the present invention is not limited to a printing unit. In place of the printing unit, a reading unit for reading an original document, an image sensing unit such as a digital camera for sensing an object, a card reader/writer for reading/writing file data in a memory card, or a communication unit for transmitting/receiving data to/from an external apparatus through a communication line may be connected in the similar manner, and similar processing may be performed to achieve the similar effects.

Furthermore, the above-described embodiment has described a case where the printing unit 115 is included in the internal unit of the image processing apparatus 100. However, even in a case where the printing unit 115 is provided external to the image processing apparatus and connected with the image processing apparatus via a USB interface, the similar effects can be expected.

As set forth above, according to the above-described embodiment, when an external processing apparatus inquires of the sub-control unit about status data, it is possible to notify the external processing apparatus of status data including management data managed by the main control unit.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 6 to 11 described in the embodiment.

The present invention is not limited to the above embodiments and various changes and modifications can be made within the spirit and scope of the present invention. Therefore to apprise the public of the scope of the present invention, the following claims are made.

What is claimed is:

1. An image processing apparatus connected to an external processing apparatus having a host function comprising:
    a printing unit having a print controller and configured to execute a PC printing based on an instruction from the external processing apparatus and a local printing based on an instruction from the image processing apparatus;
    a first interface unit configured to connect to the external processing apparatus, said first interface unit having a client function;
    a second interface unit, compliant with a communication standard identical to a communication standard of said first interface unit, connected to said printing unit, said second interface unit having the host function in communication with said printing unit;
    a first memory unit configured to store management information managed by the image processing apparatus:
    a second memory unit, which is managed by the print controller in the printing unit, configured to store status information of the printing unit; and
    a control unit configured to control a transfer of at least one of the status information and the management information, without processing the status information and the management information, between said first interface unit and said second interface unit,
    wherein, upon starting the local printing, said control unit transfers the management information stored in said first memory unit to said second memory unit via the second interface unit and, when status information of said printing unit is requested by the external processing apparatus via the first interface during execution of the local printing, receives the requested status information of said printing unit and the management information, which are stored in said second memory unit from the print controller via the second interface unit and transfers the received status information and management information to the external processing apparatus via the first interface unit.

2. The image processing apparatus according to claim 1, wherein the communication standard is the universal serial bus (USB) standard.

3. The image processing apparatus according to claim 1, wherein said control unit transmits completion information of the local printing to said printing unit to notify said printing unit of the end of the local printing.

4. The image processing apparatus according to claim 3, wherein said printing unit clears the management information stored in said first memory unit in response to reception of the completion information.

5. The image processing apparatus according to claim 1, wherein said control unit controls the image processing apparatus to periodically receive the status information and the management information from said printing unit and store the received information in said first memory unit, and when the status information is requested by the external processing apparatus during execution of the local printing, said control unit controls a transfer to the external processing apparatus of the latest status information and the management information stored in said first memory unit.

6. A control method for an image processing apparatus including a printing unit having a print controller and configured to execute a PC printing based on an instruction from an external processing apparatus and a local printing based on an instruction from the image processing apparatus; a first interface unit configured to connect to the external processing apparatus, said first interface unit having a client function; a second interface unit, compliant with a communication standard identical to a communication standard of the first interface unit, connected to said printing unit, the second interface unit having a host function in communication with the printing unit; a first memory unit configured to store management information managed by the image processing apparatus; a second memory unit, which is managed by the print controller in the printing unit, configured to store status information of the printing unit; and a control unit configured to control a transfer of at least one of the status information and the management information without processing the status information and the management information between the first interface unit and the second interface unit said control method comprising the steps of:
    using the image processing apparatus to perform the steps of:
    upon starting the local printing, transferring the management information stored in the first memory unit to the second memory unit via the second interface unit and under control of the control unit; and
    when status information of the printing unit is requested by the external processing apparatus via the first interface unit during execution of the local printing, receiving the requested status information of the printing unit and the management information stored in the second memory unit from the print controller via the second interface unit and transfers the received status information and management information to the external processing apparatus via the first interface unit.

7. The control method according to claim 6, wherein the communication standard is the universal serial bus (USB) standard.

8. The control method according to claim 6, further comprising transferring completion information of the local printing to the printing unit to notify the printing unit of the end of the local printing.

9. The control method according to claim 8, further comprising clearing the management information stored in the first memory unit in response to reception of the completion information.

10. The control method according to claim 6 further comprising the steps of:
    periodically receiving the status information and the management information from the printing unit and storing the received information in the memory unit under control of the control unit; and
    when the status information is requested by the external processing apparatus during execution of the local printing, transferring to the external processing apparatus the latest status information and the management information stored in the first memory unit under control of the control unit.

* * * * *